(No Model.)

R. McDOUGALL & C. H. SHAW.
Car Coupling.

No. 236,054. Patented Dec. 28, 1880.

Witnesses
John Becker
Fred K Haynes

Inventor
R. McDougall
Chas. H. Shaw
by their Attorneys
Brown & Brown

UNITED STATES PATENT OFFICE.

RUTHER McDOUGALL AND CHARLES H. SHAW, OF DENVER, COLORADO.

CAR-COUPLING.

SPECIFICATION forming part of Letters Patent, No. 236,054, dated December 28, 1880.

Application filed September 24, 1880. (No model.)

*To all whom it may concern:*

Be it known that we, RUTHER MCDOUGALL and CHARLES H. SHAW, both of Denver, in the county of Arapahoe and State of Colorado, have invented certain new and useful Improvements in Draw-Heads and Couplings for Cars, of which the following is a specification.

Our invention consists in the combination, in a coupling for railway-cars, of two draw-heads adapted to engage one with another, each comprising two jaws, one of which has in its inner side a cavity or recess, one end of which forms a shoulder, and a dog secured between said jaws in said cavity or recess and adapted to engage with the shoulder upon the corresponding jaw of the other draw-head when the two draw-heads are coupled. These dogs are preferably pivoted between the jaws of the draw-heads, and are actuated by springs to cause them to engage automatically with the shoulders upon the jaws of the draw-heads. When the draw-heads are moved toward each other to interlock the dogs are moved back against the force of the springs, but when the draw-heads are moved to disengage them the dogs engage with the shoulders upon the jaws and prevent the separation of the draw-heads. We also combine with each of the said dogs a link and lever, whereby it may be drawn back or shifted to release the draw-heads from each other. The pivoted dogs are so shaped and arranged that when the two draw-heads are in engagement they are side by side, and when one dog is moved or shifted by its own lever it will itself bear upon and shift the other dog.

The invention also consists in details of construction, to be hereinafter described.

Figure 1:
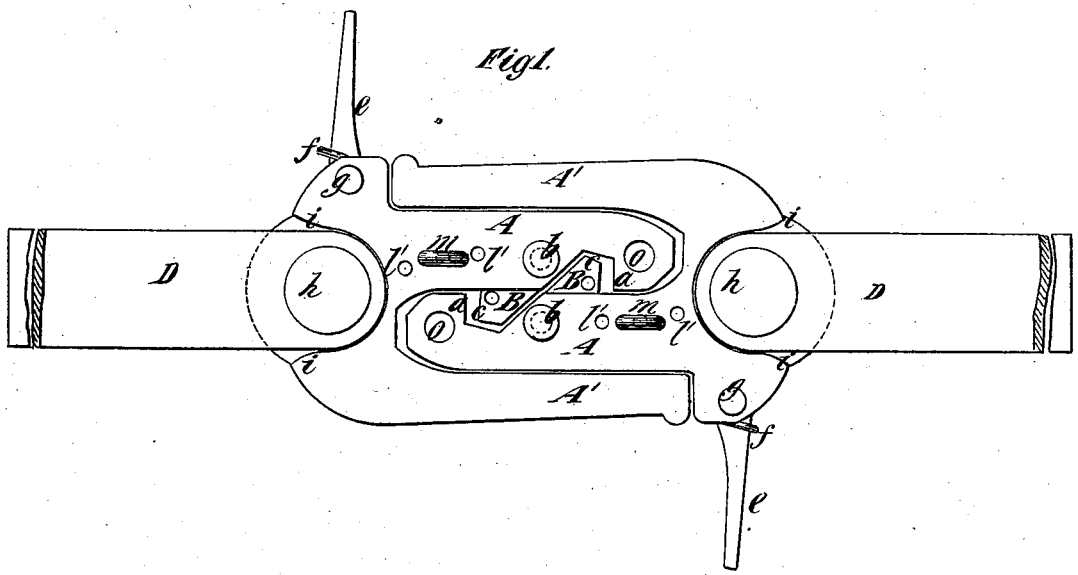
Figure 2:
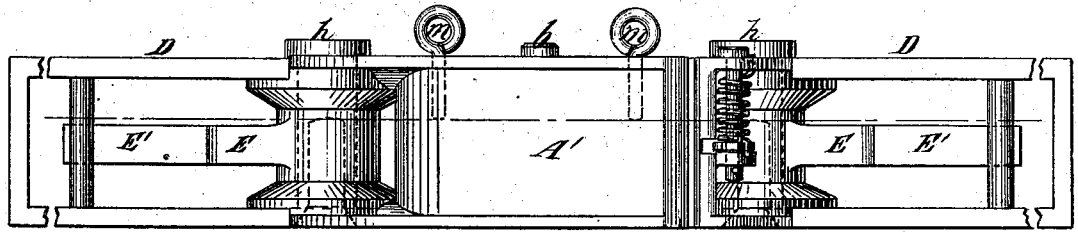
Figure 3:
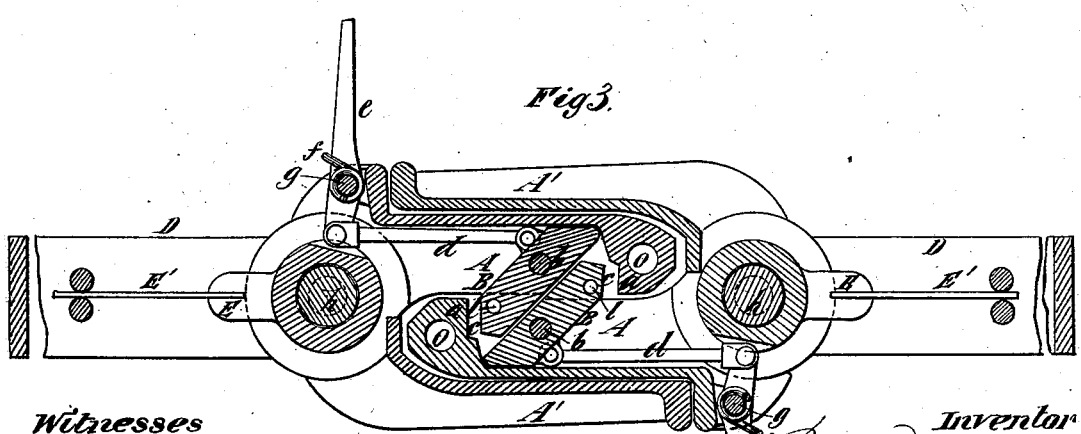

In the accompanying drawings, Figure 1 represents a plan of a coupling embodying our invention. Fig. 2 represents a side view thereof, and Fig. 3 represents a horizontal section thereof.

Similar letters of reference designate corresponding parts in all the figures.

The coupling is composed of two draw-heads, which are counterparts each of the other, each of which comprises a pair of jaws, A A'. Each draw-head is adapted to receive between its jaws the jaw A of the other draw-head, as shown clearly in Fig. 1.

The jaw A is provided upon its inner side with a recess or cavity, one end of which forms a shoulder, a, and between the jaws of each draw-head, and in said recess or cavity, is secured, by means of a pivot, b, a dog, B, which is adapted to turn or move freely on said pin. The relative arrangement of these dogs and jaws will be clearly understood from Figs. 1 and 3, in which it will be seen that when the two draw-heads are in engagement the dogs stand parallel with each other and almost in contact one with the other. The point or end of the jaws A is so formed that the movement of the two draw-heads toward each other to interlock simply moves or swings the two dogs sufficiently to enable the shoulder a upon the jaw A to pass the point or end c of the dog, whereupon the dogs are automatically shifted by means of springs, which may be applied in any suitable manner to cause their points or ends c to engage with the shoulders a upon the jaws A.

As clearly represented in Figs. 1 and 2, each of the dogs has connected with it, by a link, d, a lever, e, and by moving these levers outward the dogs are drawn back out of engagement with the shoulder a, to release the jaw A of each draw-head from between the jaws A A' of the other draw-head.

Although the springs previously referred to might be arranged in various ways, we prefer to employ springs f, coiled around the pins or pivots g, which form fulcra for the levers e.

If desirable, pins (not here shown) may be inserted in the draw-heads to keep the levers e from being moved to uncouple the draw-heads when they are once coupled.

Each draw-head is connected with and embraced by a yoke or stirrup, D, which is permanently attached to a car. The draw-head is fixed in the stirrup by a pivot, h, and is therefore adapted to swing laterally to permit of the cars passing around curves. The amount of lateral movement or swing is limited by two shoulders, i, upon the draw-head, which engage with the yoke, and preclude side movement or swinging to a greater extent than is necessary.

Each of the draw-heads is provided with a rearwardly-projecting tail-piece or arm, E, and in order to hold the draw-head in a central position when not otherwise actuated this tail-piece has an elastic connection with the yoke. In the present instance the tail-piece E is furnished with an elastic or spring extension, E', which is held rigidly at its free end in a bearing composed of two pins, between which it fits; but the entire tail-piece might be rigid and have springs applied to its opposite sides.

It will be observed that when the two draw-heads fully engage the dog of one draw-head has a strong hold upon the jaw of the other draw-head, and that such hold will be sufficient, even if the draw-heads engage for only a part of their depth, thus allowing for differences in the height of the draw-head in different cars.

In order to provide for coupling a car having our improved draw-head to another car by means of an ordinary link-coupling, the jaw A is slotted about midway of its depth to provide for the insertion of a link, and also provided with a hole, o, for the reception of a coupling-pin.

In the dogs B and draw-heads are holes $l\,l'$, and if it be desirable to prevent the draw-head of one car from coupling with the draw-head of another car the dogs may be shifted to bring the two holes into coincidence, and a pin, $m$, inserted through them to hold the dog immovable.

It will be observed that the two dogs are so nearly in contact with each other that when the lever $e$, connected to one dog, is actuated said dog will bear upon the other dog, and both will thus be moved to uncouple by operating only one of the levers $e$.

It will be observed that, inasmuch as the dogs are contained within the recesses or cavities in the inner sides of the jaws A, they are concealed and protected and do not form projections upon the outsides of the draw-heads, as in many draw-heads which are provided with coupling-hooks which project upon the outside thereof.

What we claim as our invention, and desire to secure by Letters Patent, is—

1. The combination of two draw-heads, each comprising two jaws, one of which has in its inner side a cavity or recess, one end of which forms a shoulder, and a dog secured between said jaws in said cavity or recess, and adapted to engage with the shoulder upon the corresponding jaw of the other draw-head when the two draw-heads are coupled, substantially as specified.

2. The combination of two draw-heads, each comprising two jaws, one of which has in its inner side a cavity or recess, one end of which forms a shoulder, a dog pivoted in said cavity or recess, and adapted, when the two draw-heads are coupled, to engage with the shoulder upon the other draw-head, a spring for moving said dog into engagement with said shoulder, and a lever for moving it out of engagement therewith to uncouple the two draw-heads.

3. The combination of two draw-heads, each comprising the jaw A, with its shoulder $a$, and the jaw A', the dogs B, the springs $f$, the links $d$, and the levers $e$, substantially as specified.

4. The combination of two draw-heads, each comprising the jaw A, with its shoulder $a$, and the jaw A', the dogs B, arranged with their faces in contact, or nearly in contact, the springs $f$, the links $d$, and the levers $e$, whereby the movement of one lever will actuate both dogs, all substantially as specified.

RUTHER McDOUGALL.
CHAS. H. SHAW.

Witnesses:
 C. S. HEFFERLIN,
 J. J. VECKROY.